April 19, 1949.  D. G. HILL, JR  2,467,587

COOKING TIMING MACHINE

Filed Sept. 10, 1945  4 Sheets-Sheet 1

INVENTOR.

April 19, 1949.  D. G. HILL, JR  2,467,587
COOKING TIMING MACHINE
Filed Sept. 10, 1945  4 Sheets-Sheet 2
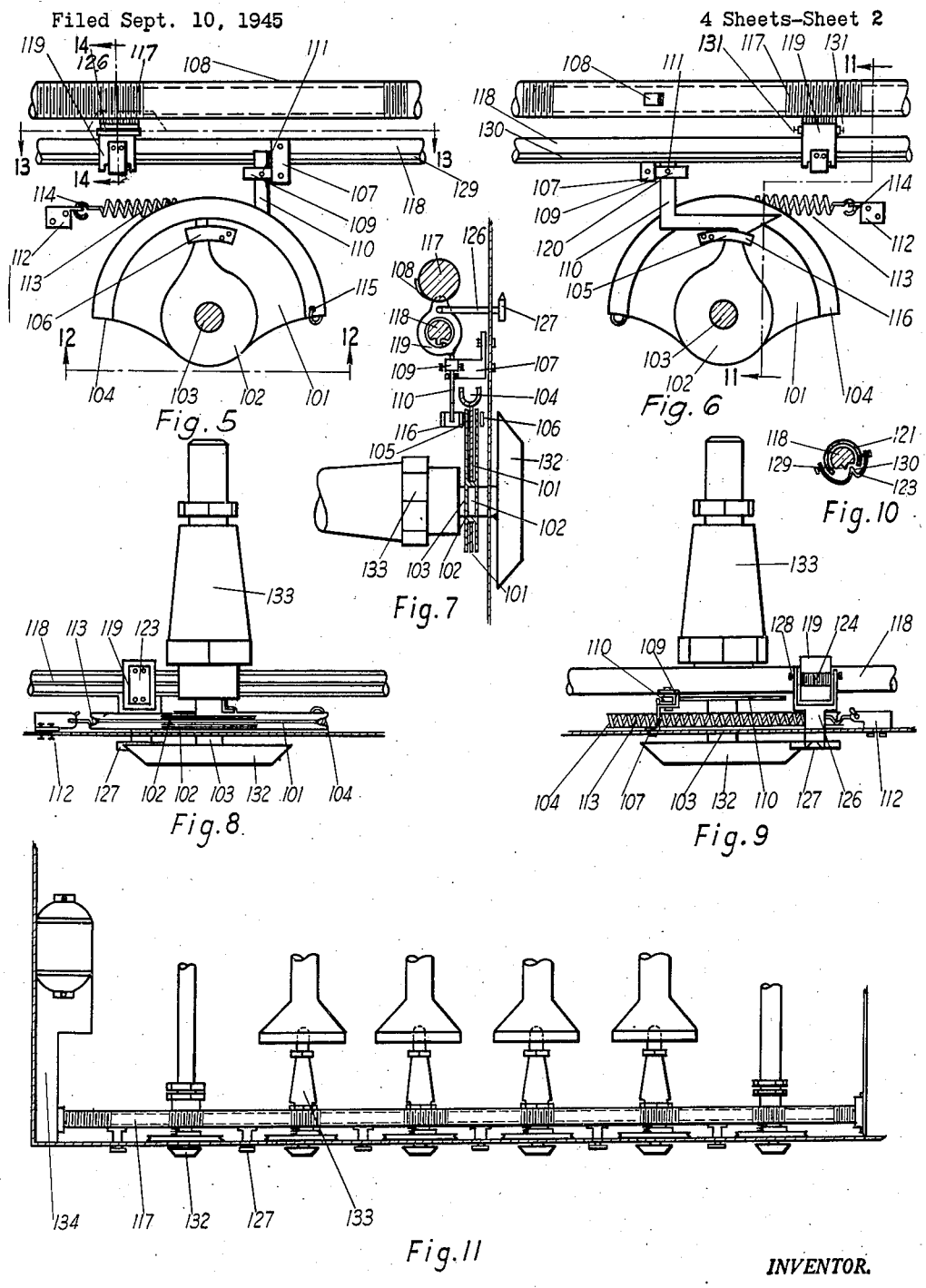
INVENTOR.
David G. Hill Jr April 19, 1949.  D. G. HILL, JR  2,467,587
COOKING TIMING MACHINE
Filed Sept. 10, 1945  4 Sheets-Sheet 3

INVENTOR.
David G. Hill Jr.

Patented Apr. 19, 1949

2,467,587

UNITED STATES PATENT OFFICE 2,467,587

COOKING TIMING MACHINE

David G. Hill, Jr., New Orleans, La.

Application September 10, 1945, Serial No. 615,416

10 Claims. (Cl. 161—9)

The invention relates to improvements in cooking time machines in which a shuttle operates on external helical ribs or threads of a revolving rod, pipe or cylinder in conjunction with a wheel, a lever, or a segment of a wheel, to close, or cut-off the valve or valves of a burner or burners of a gas range, a gas cooking stove or a gas oven in a predetermined length of time or interval; and the objects of the improvements are first, to provide an automatic device or machine which may be easily set in motion to extinguish the flames emitting from burners of a gas range, a gas cooking stove or a gas oven in a predetermined length of time; second, to provide a device to automatically extinguish such flames at the termination of the desired interval; and third, to provide a machine which after having accomplished the extinguishment of said flames, will automatically disengage itself, or for economy of construction, will disengage itself upon the first manual opening of the said cut-off valve, from the cut-off mechanisms of such ranges, stoves or ovens, so that manual operation of such cut-off mechanisms may be resumed without interference from the food timer, in order to afford facilities for the extinguishment of a gas flame being utilized for cooking food in a predetermined length of time, thereby allowing the cook full freedom to attend to other affairs with confidence that the flame or flames will be automatically extinguished as desired.

The objects and advantages of my invention will more fully appear from the following description and the accompanying drawings and will be pointed out in the appended claims.

In the accompanying drawings which illustrate a practical embodiment of my invention:

Figures 1 to 4 inclusive, 12, 13 and 14, and 15 to 18 inclusive are sectional views of the fully automatic food timer.

Figures 5 to 11, inclusive, are sectional views of the semi-automatic timer.

Figure 1:
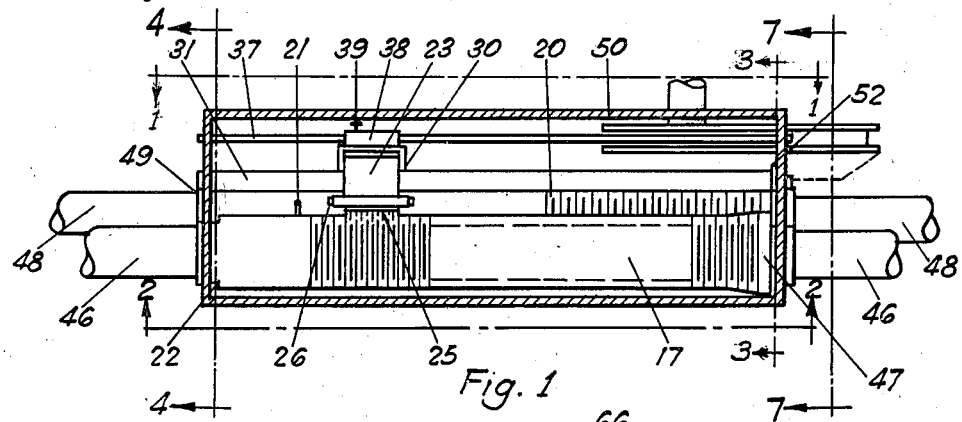
Figure 2:
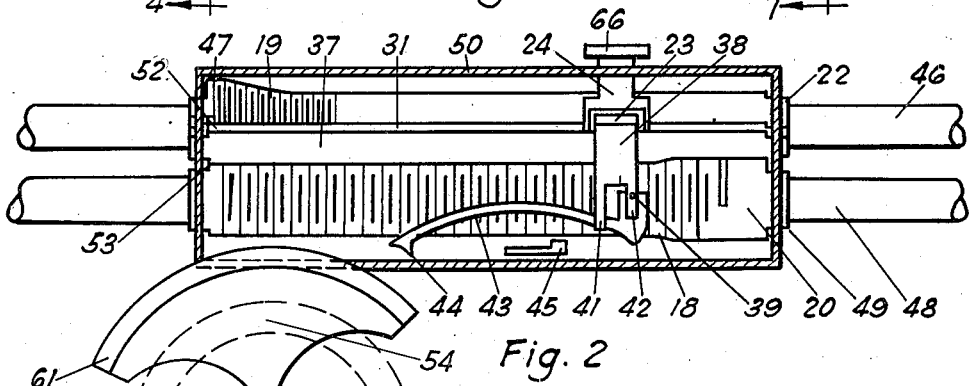
Figures 3, 4, 16:
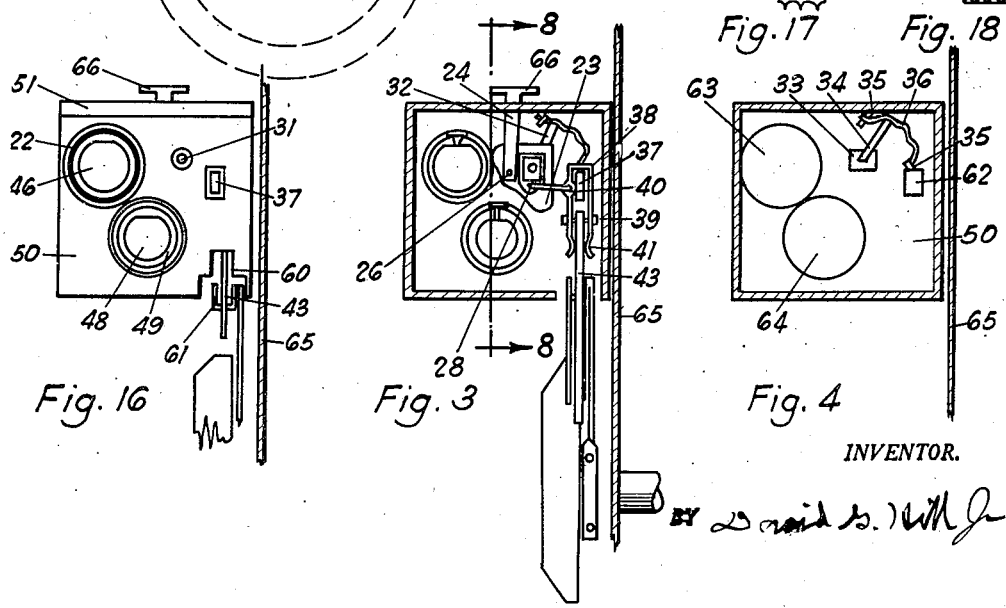
Figure 12:
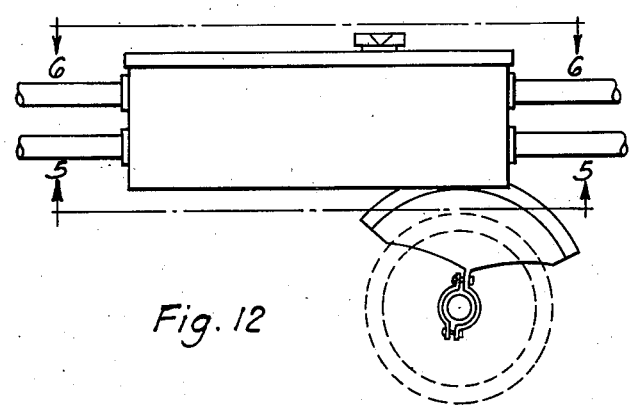
Figure 13:
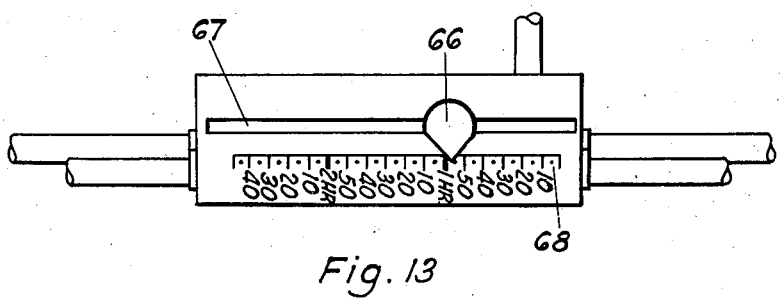
Figure 14:
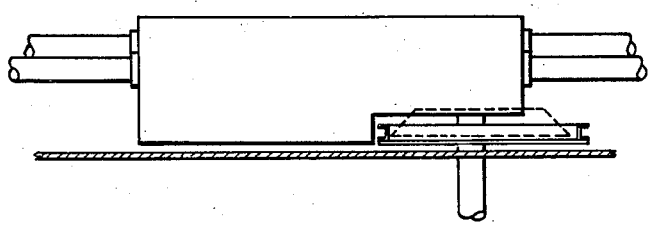
Figure 15:
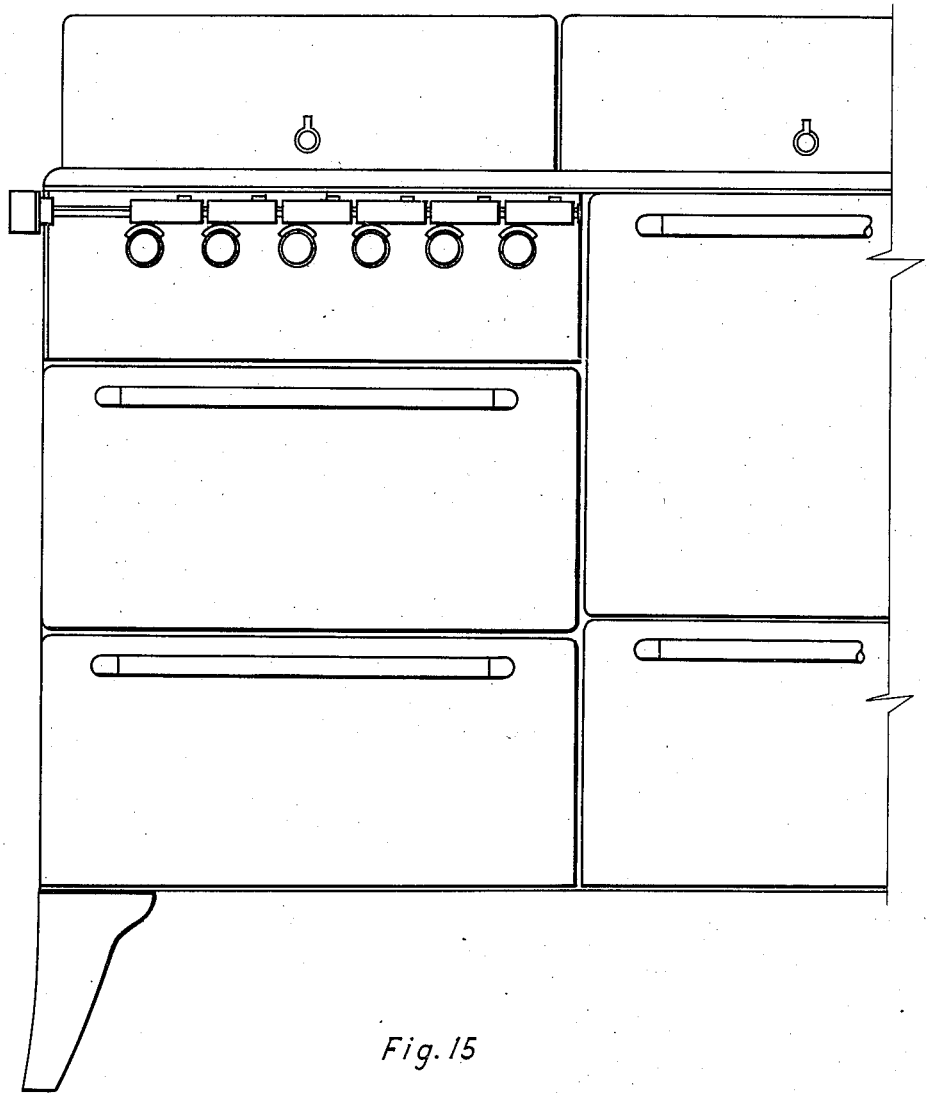

Figure 1 is a view in horizontal of the fully automatic food timer from a central position above the device. Figure 2 is a view in vertical on the line 1—1 of Figure 1. Figure 3 is a view in vertical section on the line 3—3 of Figure 1, Figure 4 is a view in vertical section on the line 4—4 of Figure 1 showing sectional view of slide rod 33, (numbered 31 in other figures), rocker pin 34, secured to slide rod 33, and rocker spring 36 secured to the end wall of casing 50, by brackets 35. Figure 12 is a view in horizontal from a position in front of the stove of the fully automatic food timer with the mechanism enclosed in casing 50. Figure 13 is a view in horizontal in the line 6—6 of Figure 12, Figure 14 is a view in horizontal on the line 5—5 of Figure 12, Figure 15 is a view in vertical of the front of a gas cooking stove with a fully automatic food timer in position over each cut-off valve handle and a fractional horse power electric motor with speed reduction gears (encased) on the left side of the stove on a level with the food timers and power shafts (encased) extending from the said speed reduction gears through the food timers in series. (This view illustrates the position of the fully automatic food timers in respect to the cut-off handles of a cooking stove which has been manufactured without provision for attaching the food timers; the plans and specifications for ranges, stoves and ovens may provide for positioning the fully automatic food timers inside of the front panel just back of the position illustrated in Figure 15.)

Figures 17, 18:
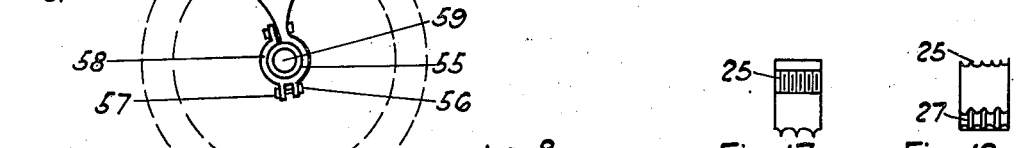

Figure 16 is a view in vertical on the line 7—7 of Figure 1 showing the necked end 22 of cylinder 17 and power shaft 46, the necked end 49 of cylinder 20 and power shaft 48 and the necked end 52 of slide rod 31, positioned in circular perforations in the end wall of casing 50, allowing the said cylinders, shafts and the slide rod to revolve or pivot, and the rectangular necked end 53 of slide rod 37, positioned in a rectangular perforation in the end wall of casing 50 holding slide rod 37 in a fixed position, and also showing slot 60 in which trough 61 of wheel segment 54 revolves and drag hook 43 passes when moving into the engagement position. Figure 17 is a view in vertical of rocker shuttle 23, in the line 8—8 of Figure 3 showing helical thread 25 on its upper horizontal projection. Figure 18 is a view in vertical of rocker shuttle 23 on the line 9—9 of Figure 3 showing helical threads 27 on its lower horizontal projection.

As shown in the drawings, I provide a casing 50 for the fully automatic food timer in the shape of a rectangular box, with a detachable lid. The bottom plate of the casing contains a longitudinal slot adjoining the rear wall in which trough 61 of wheel segment 54 is positioned, allowing the wheel segment to pivot freely. Each end wall of the casing is perforated with circular slots which serve as hubs for the ends of cylinders 17 and 20 and slide rod 31 and rectangular perforations which hold the rectangular necked ends 53 of slide rod 37 in a fixed position. One end of casing 50 contains slot 60 at the lower rear corner, which is a continuation of the said longitudinal slot for wheel segment 54, with an upward extension through which drag hook 43 passes when moving into the engagement position. Lid 51 of casing 50 contains a longitudinal slot 67 in which plunger 24 is allowed to move from side to side along time table 68 stamped into the exterior surface of lid 51 parallel with one edge of said slot 67.

I provide helical threaded cylinder 17, helical threaded cylinder 20, and square slide rod 31 positioned parallel in a triangular arrangement all with circular necked ends which are rotatably positioned in circular perforations in the end walls of casing 50 as illustrated in Figure 16; cylinder 17 is equipped externally with 30 helical threads to the inch, is flared (47) at one end and revolves at the rate of one-half of a revolution a minute; cylinder 20 is equipped externally with 10 helical threads to the inch to point 21 is flared (18) toward the end opposite from the flare on cylinder 17 and revolves at the rate of 100 revolutions per minute; the flare on cylinder 20 is one-half of the width of the diametrical extension of the flare on cylinder 17; rocker pin 34 in Figure 4 (numbered 32 in Figure 3) is secured diametrically to slide rod 33 (numbered 31 in all other figures) at one end and projects into one of three waves of undulating spring 36, the ends of which are secured to the end wall of casing 50 by brackets 35, as illustrated in Figure 4. Rocker shuttle 23 is mounted on slide rod 31 allowing the shuttle to slide freely from one end of the rod to the other. The shuttle is equipped with a horizontal projection on which is an arc of helical threads similar to the threads on cylinder 17 and is equipped with another horizontal projection on which is an arc of helical threads similar to the threads in cylinder 20.

The two helical threaded projections on rocker shuttle 23, rocker pin 34 and undulating spring 36 are positioned so that when the threads 25 of the upper projection of rocker shuttle 23 mesh with the threads on cylinder 17, the threads 27 on the lower projection of rocker shuttle 23 are disengaged from the threads of cylinder 20 and rocker pin 34 projects into the top wave of undulating spring 36, so that when slide rod 31 is pivoted until rocker pin 34 projects into the center wave of undulating spring 36 the threads on both projections on rocker shuttle 23 are disengaged from the threads of both cylinders 17 and 20, allowing the shuttle to be moved manually freely from one end of slide rod 31 to the other, and so that when slide rod 31 is pivoted until rocker pin 34 projects into the lowest wave of undulating spring 36 the helical threads 27 on the lower projection of rocker shuttle 23 mesh with the threads of cylinder 20 and threads 25 on the upper projection of the rocker shuttle are disengaged from the threads of cylinder 17.

An extension projects from each side of the lower end of plunger 24 down the ends of the upper projection from shuttle 23 and the arms are perforated and hold the ends of pivot 26 which projects through a horizontal bore in the upper projection of shuttle 23. The upper end of plunger 24 passes through longitudinal slot 67 in lid 51 of casing 50 and is equipped with a push button 66 on the upper end with a pointed extension serving as an indicator over time table 68 as the push button is moved manually longitudinally in slot 67.

Tow-shuttle 38 is composed of a non-rust spring metal in the shape of a saddle, slideably mounted on slide rod 37, with extension 42 of each of its sides down below the level of slide rod 37 which extensions are perforated and hold the ends of pivot 39 of drag hook 43 and with other separate extensions 41 of each of its sides beyond the level of the ends of extensions 42, closing together near their lower ends and then spreading apart at the ends sufficiently to receive the width of drag hook 43, and forming pincers which clasp drag hook 43 and hold it off the floor of the casing and out of contact with trough 61 of wheel segment 54 when drag hook 43 is idle.

Drag hook 43 pivots freely on pivot 39, extends downward from the pivot and then in an arc toward its engagement position so that it clears pincers 41 and curves around the rim of wheel segment when its tooth end falls by gravitation into position where its tooth hooks over the end of the floor of trough 61. When the drag hook is held in the clasp of pincers 41 its curved section is positioned horizontally with the tooth end of the lowest level so that when the drag hook is towed longitudinally by tow-shuttle 38 toward the engagement position its tooth end passes slightly beneath the upper edge of slot 60. Casing 50 at the upper edge of slot 60 strikes the upper curved edge of the drag hook and as the longitudinal movement of the drag hook continues its upper curved edge slides under the edge of the casing forcing the tooth end downward until the drag hook falls out of the clasp of pincers 41 into trough 61 and continues its longitudinal movement until the tooth of the drag hook hooks over the end of the trough. As tow-shuttle 38 tows drag hook 43 on the return movement on slide rod 37, the tooth of the drag hook hooks over the end of the trough. As tow-shuttle 38 tows drag hook 43 on the return movement on slide rod 37, the tooth of the drag hook pivots wheel segment 54 counterclockwise until the gas valve is closed and during the operation the tooth end of the drag hook is lifted over the arc of the rim of the wheel segment forcing the drag hook up between pincers 41 and simultaneously with the closing of the gas valve dog 45 strikes the lower edge of the elbow of the drag hook lifting its tooth out of engagement with the wheel segment 54, thereby providing for the resumption of the manual operation of the gas cut-off valve handle without interference from the food timer.

One side of tow-shuttle 38 is bent outward at a point near the lower edge of slide rod 37, toward rocker shuttle 23 and then bent into a loop 40 forming a hub for coupling 30. The slot in rocker shuttle 23 through which slide rod 31 passes fits slideably close to the sides and top surfaces of the slide rod and fits slideably close around one lower corner of the slide rod and then extends downward and then runs in a fan shape toward tow-shuttle 38. Coupling 30 has the shape of a rectangular parallelogram, one end of which passes through the loop 40 of tow-shuttle 38 and the other end passes through the fan shaped slot in rocker shuttle 23 beneath slide rod 31. The purpose of the said fan shaped slot is to allow the rocker shuttle to pivot with slide rod 31 while attached by coupling 30 to tow shuttle 38.

Wheel segment 54 is in the shape of a fan with a flange at its rim turning down the wheel plate, then outward and then upward forming a trough in which drag hook 43 slides into the engagement position. The handle shaped projection 55 of wheel segment 54 is twisted 90 degrees and then is bent half around stem 59 of the cut-off valve handle. The handle end 55 of the wheel segment is secured to stem 59 by clamp plate 58 and screw bolts 57, and is sufficiently narrow to be mounted on stem 59 of most all ranges, cooking stoves and ovens between the cut-off handle and the front panel of such ranges, stoves and ovens. If the space between the cut-off handle and the range or oven is too narrow, a new handle with a longer stem may be supplied.

Casing 50 is positioned on the front panel of the range, stove or oven in respect to wheel segment 54, as illustrated in Figures 2, 3 and 12, so that the tooth of drag hook 43 will hook around the end of trough 61 of wheel segment 54 when tow-shuttle 38 is propelled on slide rod 37 to the end wall of the timer casing containing slot 60.

Power shaft 46 is geared to the last of the series of speed reduction gears of a fractional horse power electric motor and revolves at the speed of one-half of a revolution a minute. Power shaft 48 is geared to an intermediate gear in said series, and revolves at the speed of 100 revolutions a minute. Power shaft 46 passes through helical threaded cylinder 17 and is secured to the cylinder by a set screw. Power shaft 48 passes through helical threaded cylinder 20 and is secured to the cylinder by a set screw. The timers are held in position on the front panel of the range, stove or oven by the power shafts which connect at one end with the speed reduction gears of the electric motor which is secured to the side panel of the range, stove or oven by bolts, and by the projection of the other ends of the power shafts into hubs in a bracket which is secured to the front panel of the range, stove or oven by bolts, as illustrated in Figure 15.

The purpose of the adjustable helical cylinders mounted on the power shafts is to utilize a single source of power for a single cooking timer or for two or more cooking timers operating on the same range, stove or oven in series, and to space the timers apart according to the distance between the cut-off valves of any range, gas cooking stove or gas oven.

When not functioning the mechanism of the automatic food timer will be in the neutral position, with rocker pin 34 projecting into the center wave in undulating spring 36, and helical threads 25 and 27 on rocker shuttle 23 disengaged from the threads of cylinders 17 and 20.

With cylinder 17 revolving at the speed of one half a revolution a minute and cylinder 20 revolving at the speed of 100 revolutions a minute, to set the fully automatic food timer for the desired time interval and start it to function, push button 66 is manually moved horizontally in slot 67 along time table 68 until its pointed edge is over the desired time interval, and the push button is then manually pressed downward pivoting rock shuttle 23 together with slide rod 31 until the upper end of rocker pin 34 moves from the center wave in undulating spring 36 to the highest wave and helical threads 25 mesh with the helical threads on revolving cylinder 17 which propel the rocker shuttle on slide rod 31 to the end of the threads on flare 47. When threads 25 move up to the crest of flare 47, rocker shuttle 23 is pivoted until rocker pin 34 moves from the highest wave to the lowest wave in undulating spring 36, helical threads 25 of rocker shuttle 23 disengaged from the threads of cylinder 17, and helical threads 27 of rocker shuttle 23 mesh with the threads of revolving cylinder 20 at the end of the desired time interval. As rocker shuttle 23 has moved toward flare 48 it has drawn tow-shuttle 38 along by means of coupling 30, forcing the curved outer edge of drag hook 43 to slide under the upper edge of slot 60 thereby pivoting drag hook 43 downward until it is pulled from the grasp of pincers 41 and falls by gravitation into trough 61 of wheel segment 54 and the tooth of the drag hook catches around the end of the floor of the trough simultaneously with the rocking of shuttle 23 from engagement with revolving cylinder 17 to engagement with revolving cylinder 20, as aforementioned. Rocker shuttle 23, then immediately begins to move in the reverse direction on the threads of revolving cylinder 20 drawing tow-shuttle 38 along thereby dragging drag hook 43 and thus pivoting wheel segment 54 until the cut-off valve of the gas range, gas cooking stove or gas oven is closed in the predetermined length of time. While the drag hook is pivoting the wheel segment, the tooth end of the drag hook rises over the arc of the rim of the wheel segment and the drag hook is forced between the clamp of pincers 41 and simultaneously with the closing of the gas valve the lower edge of the elbow of drag hook 43 strikes dog 45 forcing the drag hook upward until its tooth is lifted out of engagement with the wheel segment, and thus allowing resumption of the manual operation of the said gas cut-off valve handle without interference from the fully automatic food timer.

Tow-shuttle 38 continues to be drawn by rocker shuttle 23 until threads 27 of the rocker shuttle move up to the crest of flare 48 on cylinder 20 and the rocker shuttle is pivoted until rocker pin 34 moves from the lowest wave of undulating spring 36 into the center wave and the helical threads of the rocker shuttle are disengaged from helical threads of both cylinder 17 and cylinder 20, allowing manual movement of push button 66 back and forth in slot 67.

The fully automatic food timer closes the gas cut-off valve in approximately six seconds after the expiration of the predetermined time interval.

The fully automatic food timer in casing 50 is described herein is for attachment to gas ranges, gas cooking stoves or gas ovens which have been maufactured without provision for attachment to the stem of the cut-off handle inside of the stove walls. Provisions may be made in plans and specifications for gas ranges, gas cooking stoves and gas ovens yet to be manufactured for positioning the fully automatic food timers inside of the walls of such ranges, stoves or ovens over the stem of the cut-off valve handle with vertical plates secured to the front panel of the range, stove or oven to function as hubs for slide rod 31, and as a bracket for slide rod 37 and undulating spring 36 and one helical threaded cylinder 17 and one helical threaded cylinder 20 may project directly from the speed reduction gears of the electric motor through the timer in series and the separate cylinders for each timer eliminated similar to the arrangement shown in Figure 11 for the semi-automatic food timer.

In the drawings:

Figure 5 is a view in vertical of the semi-automatic food timer from a horizontal position directly in front of a stove, Figure 6 is a view in vertical of the semi-automatic food timer from a horizontal position toward the rear of a stove, Figure 7 is a view in vertical section of the semi-automatic food timer on the line 11—11 of Figure 6, Figure 8 is a view in horizontal of the semi-automatic food timer on the line 12—12 of Figure 5, Figure 9 is a view in horizontal of the semi-automatic food timer on the line 13—13 of Figure 5, Figure 10 is a cross section view in vertical section of shuttle 119 in the line 14—14 of Figure 5, Figure 11 is a sectional view in horizontal of a cooking stove with a semi-automatic food timer mounted on the stem 103 of each cut-off valve handle 132, with cylinder 117 in its service position and connected to the axis of the last in the series of speed reduction gears (enclosed in casing 134) of a fractional horse power electric motor.

I provide a rod or cylinder 117 equipped externally with 30 helical threads or ribs to the inch which is positioned horizontally parallel with the front panels of a gas range, a gas cooking stove or a gas oven, above stems 103 of the cut-off valve handles. Positioned parallel with cylinder 117 is slide rod 118 with longitudinal grooves 129 and 130 on which is slideably mounted shuttle 119 comprising a ring band 121 extending approximately three-fourths around slide rod 118 with a vertical projection positioned horizontally across the band on which is an arc of helical threads similar to the threads on cylinder 117, and a curved leaf spring 123 projecting at its center section into a longitudinal groove in slide rod 118 and secured to the shuttle by brads, plunger 126 with two arms 131 extending from one end which are perforated, which perforations hold the ends of pivot 128 which projects through a bore in the shuttle projection. Plunger 126 projects through a horizontal slot in the front panel of the range, stove or oven along the edge of which is a time table similar to the slot 67 and time table 68 in Figure 13 for the fully automatic food timer. The plunger is equipped on the end which projects through the slot with push button 127. The function of longitudinal groove 130 in slide rod 118 with the projection of spring 123 into groove 130 is to hold shuttle 119 in a fixed position rotatably as the shuttle is propelled on the helical threads of cylinder 117 longitudinally on slide rod 118. The function of groove 129 is to hold the shuttle in a fixed position rotatably on slide rod 118 when the shuttle is disengaged from helical threads of cylinder 117, allowing the shuttle to be moved manually longitudinally on slide rod 118. The function of plunger 126 is to tow shuttle 119 longitudinally on slide rod 118 as plunger push button 127 is moved horizontally manually, and to revolve shuttle 119 until the projection in spring 123 moves from groove 129 to 130 of slide rod 118 thereby causing the helical threads on the shuttle extension to engage with the helical threads of cylinder 117, when the plunger is pressed longitudinally manually.

Two disks 102, each perforated at the center with a round hole and connected at the circumference of the hole by a ring, are mounted on and are secured to stem 103 of the gas cut-off valve handle. A projection is extended through the upper arc of each disk, which extensions form arms. Rotatably mounted between the two disks is wheel segment 101, thereby holding the wheel segment in an upright position and allowing the wheel segment to pivot freely between the disks. A dog is secured to wheel segment 101 in its upper section on each side by brads passing through the wheel plate and through the dogs. Dog 106 on the front side extends outward and then forward. Dog 105 on the rear side extends outward and then forward, then backward, then outward again and then forward again. The first outward and forward extension of the dogs serve as catches for the arms of disks 102 when the gas cut-off valve is opened manually. The projection of dog 105 which forms a U in turning backward, then outward and then forward, serves as a catch 116 for latch 110. Wheel segment 101 is equipped with flanges forming a trough 104 at its rim comprising a channel for coil spring 113, which is secured at one end by hooking through a perforation 115 in the wall of the side of trough 104 at one of its ends and is fastened at the other end by hooking through perforation 114 in bracket 112 which is secured to the front panel of the range, stove or oven. Bracket 107 is secured to the front panel of the range, stove or oven on a level with slide rod 118, and its lower section is bent outward; and then is bent to the right, then outward slightly, and then to the left forming a U, both sides of which are perforated, which perforation forms hubs for the ends of pivot 111 for gravity lever latch 110. The purpose of the short, vertical arm of latch 110, extending above pivot 111 is to reduce the distance shuttle 119 has to travel after striking the lever arm until the horizontal latch end of the lever is lifted out of an engaged position with catch 116 of dog 105. The latch end of lever latch 110 tapers upward to a point in order to provide a slide lift for the lever when the catch 116 of dog 105 strikes the angular edge and lifts the lever until the latch tooth drops into catch 116. Projection 120 acts as a stop for lever latch 110 and holds the catch end of the lever in a horizontal position so that catch 116 will strike the angular edge of the lever when wheel segment 101 revolves.

With cylinder 117 revolving to set the semi-automatic food timer in motion in order to close the cut-off valve in a predetermined length of time, push button 127 is manually moved sidewise along the time table until its pointed edge is over the desired time interval and the push button is then manually pushed until the projection in spring 123 secured to shuttle 119 moves from groove 130 into groove 129 of slide rod 118 and the helical threads 124 engage with the helical threads on cylinder 117 and shuttle 119 is propelled on slide rod 118 until it pushes the short vertical arm of lever latch 110 to the left until the tooth on the latch end is lifted out of catch 116, allowing coil spring 113 to swiftly pivot wheel segment 101 causing dogs 105 and 106 to simultaneously strike the arms of disks 102 forcing the disks to revolve until the said cut-off valve is closed in the predetermined length of time.

Trip 108 is secured to cylinder 117 and is equipped on its engagement end with an arc of a helical thread rising gradually from the surface of cylinder on the trip and engages the threads of shuttle 119 immediately after the shuttle has disengaged lever latch 110 from catch 116. As the thread on the end of the shuttle projection engages the thread on trip 108 the shuttle is forced to pivot and continues to pivot as the diametrical extension of the trip moves against the helical threaded extension of the shuttle until the threads of the shuttle are disengaged from the threads of the cylinder and the projection on spring 123 moves from groove 130 into groove 129 and holds the shuttle in a fixed rotary position to be moved manually longitudinally on slide rod 118.

The only difference in the manual operation of the fully automatic food timer and the semi-automatic food timer is that the fully automatic food timer automatically disengages itself from the stem of the cut-off valve handle when the valve is closed, and the semi-automatic food timer does not so disengage itself, but remains in an engaged position with coil spring 113 exerting pressure to keep the valve in a closed position until the cut-off valve is fully opened manually, which manual operation pivots disks 102 causing their arms to press clockwise against dogs 105 and 106 thereby revolving wheel segment 101 in the clockwise direction until catch 116 strikes lever latch 110 and the tooth of the lever latch falls into catch 116 at the time when the cut-off valve is fully open, thus turning wheel segment 101 to its original position and latching it there with coil spring stretched and ready to close the valve again, and with the semi-automatic food timer disengaged from the key to the cut-off valve allowing the resumption of the manual operation of the valve without interference from the semi-automatic food timer.

The semi-automatic food timer has the same aptitude for utilizing a single source of power for operation singly or in series as the fully automatic food timer, as aforementioned.

When the semi-automatic food timers are to be affixed to gas ranges, gas cooking stoves or gas ovens which have been manufactured without provisions for attaching the semi-automatic food timer to the stems of the cut-off valve handles on the inside of the front panel, the food timers may be mounted on said stems on the outside between the front panel and the cut-off valve handle, and a casing or shield may be provided by securing a plate horizontally to the front panel above the food timer mechanisms, extending outward and then downward and equipped with longitudinal slots for the projection of control plunger and with time tables along the upper edge of the slots. The semi-automatic food timers have the same utility for attachment to the stem of the cut-off valve in a narrow space between the cut-off valve handle and the front panel of the range, stove or oven, as mentioned hereinbefore for the fully automatic food timer.

Disks 102 of the semi-automatic food timer may be secured to the key to the cut-off valve by means of a flange equipped with a set screw, or if the space is too narrow, the disks may be welded to the said key, or a new handle with a longer stem may be supplied preferably the latter.

The fractional horse power electrical motor may be any electric motor of the proper power, equipped with worm or other gears to reduce the applied speed from the speed of the motor to one-half of a revolution per minute, or if circumstances warrant a hand wind power spring may be substituted, equipped with any suitable clockwork mechanism to regulate the power escapement, in order that the applied power will revolve the helical threaded rod, pipe or cylinder of the food timers at the speed of one-half of a revolution per minute.

I claim as my invention:

1. In combination a fluid control apparatus comprising a plurality of valves having stems, manually engageable means on said stems for opening said valves, a segment fixed on each stem, actuating means operatively associated with each segment for closing said valves, timing means for initiating operation of said actuating means comprising a screw threaded shaft, means for driving said shaft, a rod disposed adjacent and parallel to said shaft, a plurality of shuttles corresponding in number to the number of valves slidably mounted on said rod, complementary means on said shuttle selectively engageable with the threads on said shaft whereby upon rotation of said shaft said shuttle will be moved along said rod and means carried by said shuttle for initiating operation of said actuating means upon a predetermined movement of said shuttle whereby said valves will be closed after a predetermined time interval.

2. In combination a fluid control apparatus comprising a valve having a stem, manually engageable means on said stem for opening said valve, a segment fixed on said stem, actuating means operatively associated with said segment for closing said valve, timing means for initiating operation of said actuating means comprising a screw threaded shaft, means for driving said shaft, a rod disposed adjacent and parallel to said shaft, a shuttle slidably mounted on said rod, complementary means on said shuttle selectively engageable with the threads on said shaft whereby upon rotation of said shaft said shuttle will be moved along said rod and means carried by said shuttle for initiating operation of said actuating means upon a predetermined movement of said shuttle whereby said valve will be closed after a predetermined time interval.

3. In combination a gas control apparatus comprising a plurality of valves having stems, manually engageable means on each stem for opening said valves, a pawl fixed on each of said stems, a timing mechanism for closing said valves after a predetermined time interval comprising first and second spaced shafts, means for driving each of said shafts, each of said shafts having a plurality of spaced threaded portions, one for each of said valves, the threaded portions on said first shaft terminating at one end in a tapered enlarged portion, a rod rotatably supported in spaced relation and parallel to said shafts, a plurality of shuttles, one for each of said valves, slidably mounted on said rod, each of said shuttles having a complementary portion for alternate engagement with a threaded portion of said first and second shafts, a fixed rod disposed parallel to and spaced from said shafts and said rotatable rod, a rider for each of said shuttles slidably disposed on said fixed rod, a plurality of spring fingers on each rider, a link connecting one of the spring fingers of each rider with its associated shuttle, a dog pivotally mounted on the other spring finger of each rider, said dog being normally held in inoperative position between said spring fingers, an elongated spring having a plurality of depressed portions mounted on each of said riders, a finger mounted on each of said shuttles and engaging said spring whereby upon engagement of said finger with one of said depressions the cooperating means on said shuttles will engage said first shaft and upon engagement of said finger with a second depression said cooperating means will be in neutral position and upon engagement of said finger with a third depression said second shaft will be engaged, a finger engaging member secured to each of said shuttles for selective engagement of said cooperating means with either of said shafts or in neutral position and for positioning said shuttle axially of said shafts, whereby upon engagement of said cooperating means with the threaded portion of said first shaft said shuttle will move toward the tapered enlarged portion and upon engagement therewith said cooperating means will be moved into engagement with the threaded portion of said second shaft and through the operation of said links said dogs will be released to engage said pawl and said shuttle will be moved at a relatively rapid rate in the opposite direction to close said valves.

4. In combination a gas control apparatus comprising a valve having a stem, manually engageable means on said stem for opening said valve, a pawl fixed on said stem, a timing mechanism for closing said valve after a predetermined time interval comprising first and second spaced shafts, means for driving each of said shafts, each of said shafts being threaded, the threads on said first shaft terminating at one end in a tapered enlarged portion, a rod rotatably supported in spaced relation and parallel to said shafts, a shuttle slidably mounted on said rod, said shuttle having a complementary portion for alternate engagement with the threads of said first and second shafts, a fixed rod disposed parallel to and spaced from said shafts and said rotatable rod, a rider slidably disposed on said fixed rod, a plurality of spring fingers on said rider, a link connecting one of the spring fingers with said shuttle, a dog pivotally mounted on the other spring finger, said dog being normally held in inoperative position between said spring fingers, an elongated spring having a plurality of depressed portions mounted on said rider, a finger mounted on said shuttle and engaging said spring whereby upon engagement of said finger with one of said depressions the cooperating means on said shuttle will engage said first shaft and upon engagement of said finger with a second depression said cooperating means will be in neutral position and upon engagement of said finger with a third depression said second shaft will be engaged, a finger engaging means secured to said shuttle for selective engagement of said cooperating means with either of said shafts or in neutral position and for positioning said shuttle axially of said shafts whereby upon engagement of said cooperating means with the threads of said first shaft said shuttle will move toward the tapered enlarged portion and upon engagement therewith said cooperating means will be moved into engagement with the threads of said second shaft and through the operation of said link said dog will be released to engage said pawl and said shuttle will be moved at a relatively rapid rate in the opposite direction to close said valve.

5. In combination a gas control apparatus comprising a valve having a stem, manually engageable means on said stem for opening said valve, a pawl fixed on said stem, a timing mechanism for closing said valve after a predetermined time interval comprising first and second spaced threaded shafts, the threads on said first shaft terminating at one end in a tapered enlarged portion, means for driving said shafts, a shuttle mounted for slidable movement parallel to said shafts, complementary means on said shuttle for alternate engagement with the threads on said first and second shafts, a rider mounted for slidable movement parallel to said shafts, a plurality of spring fingers on said rider, a link connecting one of the spring fingers with said shuttle, a dog pivotally mounted on the other spring finger, said dog being normally held in inoperative position between said spring fingers, a finger engaging member secured to said shuttle for selective engagement of said cooperating means with either of said shafts or in neutral position and for positioning said shuttle axially of said shafts whereby upon engagement of said cooperating means with the threads of said first shaft said shuttle will move toward the tapered enlarged portion and upon engagement therewith said cooperating means will be moved into engagement with the threaded portion of said second shaft and through the operation of said link said dog will be released to engage said pawl and said shuttle will be moved at a relatively rapid rate in the opposite direction to close said valve.

6. In combination a control apparatus comprising an operating member, manually engageable means on said member for moving the same in one direction, a pawl fixed on said member, a timing mechanism for moving said member in the opposite direction after a predetermined time interval comprising first and second spaced threaded shafts, the threads on said first shaft terminating at one end in a tapered enlarged portion, means for driving said shafts, a shuttle mounted for slidable movement parallel to said shafts, complementary means on each shuttle for alternate engagement with the threads of said first and second shafts, a rider mounted for slidable movement parallel to said shafts, a dog pivotally mounted on said rider, resilient means on said rider for normally holding said dog in inoperative position, a link connecting said resilient means and said shuttle, a finger engaging member secured to said shuttle for selective engagement of said cooperating means with either of said shafts or in neutral position and for positioning said shuttle axially of said shafts whereby upon engagement of said cooperating means with the threaded portion of said first shaft said shuttle will move toward the tapered enlarged portion and upon engagement therewith said cooperating means will be moved into engagement with the threaded portion of said second shaft and through the operation of said link said dog will be released to engage said pawl and said shuttle will be moved at a relatively rapid rate in the opposite direction to thus move said operating member.

7. In combination a gas control apparatus comprising a plurality of valves having stems, manually engageable means on said stems for opening said valves, a segment fixed on each of said stems, tension springs each having one end thereof secured to said segments and the opposite ends fixed whereby upon movement of said valves to open position said springs will be placed under tension, a catch on each of said segments, pivotally mounted latches engageable with each catch to hold said valves in open position, a timing mechanism for initiating closing of said valves, comprising a rotatably mounted shaft, means for driving said shaft, a plurality of threaded portions on said shaft one for each valve, a rod disposed adjacent and parallel to said shaft, a plurality of shuttles one for each valve slidably mounted on said rod, cooperating means on said shuttles for selectively engaging the threaded portions of said shaft whereby upon rotation of said shaft said shuttles will be moved along said rod, finger engaging means for selectively engaging said cooperating means with said threaded portion and positioning said shuttles axially of said shaft and means on said shuttles for engaging and releasing said latch members upon a predetermined movement of said shuttles whereby said valves will be closed by the action of said springs.

8. In combination a gas control apparatus comprising a valve having a stem, manually engageable means on said stem for opening said valve, a segment fixed on said stem, a tension spring having one end thereof secured to said segment and the opposite end fixed whereby upon movement of said valve to open position said spring will be placed under tension, a catch on said segment, a pivotally mounted latch engageable with said catch to hold said valve in open position, a timing mechanism for initiating closing of said valve comprising a rotatably mounted shaft, means for driving said shaft, threads on said shaft, a rod disposed adjacent and parallel to said shaft, a shuttle slidably mounted on said rod cooperating means on said shuttle for selectively engaging the threads on said shaft whereby upon rotation of said shaft said shuttle will be moved along said rod, finger engaging means for selectively engaging said cooperating means with said threads and positioning said shuttle axially of said shaft and means on said shuttle for engaging and releasing said latch member upon a predetermined movement of said shuttle whereby said valve will be closed by the action of said spring.

9. In combination a gas control apparatus comprising a valve having a stem, manually engageable means on said stem for opening said valve, a lever fixed on said stem, a tension spring having one end thereof secured to said lever and the opposite end fixed whereby upon movement of said valve to open position said spring will be placed under tension, a catch on said lever, latch means engageable with said catch to hold said valve in open position, a timing mechanism for initiating closing of said valve comprising a threaded shaft, means for driving said shaft, a slidably mounted shuttle having means for selectively engaging the threads on said shaft whereby upon rotation thereof said shuttle will be moved axially, finger engaging means for selectively engaging said cooperating means with said threads and positioning said shuttle axially of said shaft and means on said shuttle for engaging and releasing said latch means upon a predetermined movement of said shuttle whereby said valve will be closed by the action of said spring.

10. In combination a control apparatus comprising an operating member, manually engageable means on said member for moving the same in one direction, a lever fixed on said member, a tension spring having one end thereof secured to said lever and the opposite end fixed whereby upon movement of said member in one direction said spring will be placed under tension, a catch on said lever, latch means engageable with said catch to hold said member in one position against the action of said spring, a timing mechanism for initiating movement of said member in the opposite direction comprising a threaded shaft, means for driving said shaft, a slidably mounted shuttle having means for selectively engaging the threads on said shaft whereby upon rotation thereof said shuttle will be moved axially, finger engaging means for selectively engaging said cooperating means with said threads and positioning said shuttle axially of said shaft and means on said shuttle for engaging and releasing said latch means upon a predetermined movement of said shuttle whereby said member will be moved in the opposite direction under the action of said spring.

DAVID G. HILL, JR.

REFERENCES CITED

The following references are of record in the file of this patent:

UNITED STATES PATENTS

| Number | Name | Date |
| --- | --- | --- |
| 1,007,415 | Bates | Oct. 31, 1911 |
| 1,257,352 | Horn | Feb. 26, 1918 |
| 1,516,402 | Ordway | Nov. 18, 1924 |
| 2,067,266 | Gikow | Jan. 12, 1937 |